(12) United States Patent
Corsaro

(10) Patent No.: US 8,048,302 B2
(45) Date of Patent: Nov. 1, 2011

(54) FILTERING APPARATUS WITH HINGE BELT

(76) Inventor: Donald F. Corsaro, Chardon, OH (US)

( * ) Notice: Subject to any disclaimer, the term of this patent is extended or adjusted under 35 U.S.C. 154(b) by 467 days.

(21) Appl. No.: 12/332,704

(22) Filed: Dec. 11, 2008

(65) Prior Publication Data

US 2009/0152186 A1 Jun. 18, 2009

Related U.S. Application Data

(60) Provisional application No. 61/007,473, filed on Dec. 13, 2007.

(51) Int. Cl.
*B01D 33/04* (2006.01)
(52) U.S. Cl. .......................... 210/297; 210/400; 210/401
(58) Field of Classification Search .................. 210/297, 210/400, 401, 402, 403
See application file for complete search history.

(56) References Cited

U.S. PATENT DOCUMENTS

| | | | |
|---|---|---|---|
| 1,411,945 A | 4/1922 | Wallene | |
| 2,095,504 A | 10/1937 | Kesti et al. | |
| 3,391,786 A | 7/1968 | Beattie | |
| 5,098,564 A | 3/1992 | Miller et al. | |
| 6,709,578 B2 * | 3/2004 | Wilcher | 210/158 |
| 7,014,754 B2 | 3/2006 | Wilcher | |
| 2005/0040014 A1 | 2/2005 | Magaldi | |
| 2006/0124523 A1 | 6/2006 | Ackermanns et al. | |
| 2007/0181492 A1 * | 8/2007 | Uchiyama et al. | 210/523 |

OTHER PUBLICATIONS

International Search Report and Written Opinion for PCT/US2008/86389, filed Dec. 11, 2008, mailed Feb. 3, 2009.
Office action dated Apr. 26, 2011 in corresponding European Application No. 08860170.3, filed May 19, 2010.

* cited by examiner

Primary Examiner — Fred Prince
(74) Attorney, Agent, or Firm — Rankin, Hill & Clark LLP

(57) ABSTRACT

An endless belt filtering system for separating solid particles from a flow of contaminated liquid to produce a generally clean liquid. The system having a continuous loop belt extending between a first end and a second end and being formed by a plurality of plates pivotably joined to one another about space horizontal axes. The plurality of plates together forming an outwardly facing side and an inwardly facing side, the belt further including an upper section wherein the outward side generally faces up and moves from the first end toward the second end and an opposite lower section wherein the outward side generally faces down and moves from the second end toward the first end. The system having a housing forming a tank with a bottom, an end wall near the first end and a pair of side walls extending from the end wall. The lower section of the belt including a bottom region passing near the tank bottom and the plurality of plates including pivot plates having pivoting flaps that are pivotable between an opened condition and a closed condition. The flaps being in the opened condition when in the bottom region and in the closed condition when in the inlet region such that movement of the portion of particles through the belt is restricted in the inlet region and is promoted in the bottom region.

26 Claims, 9 Drawing Sheets

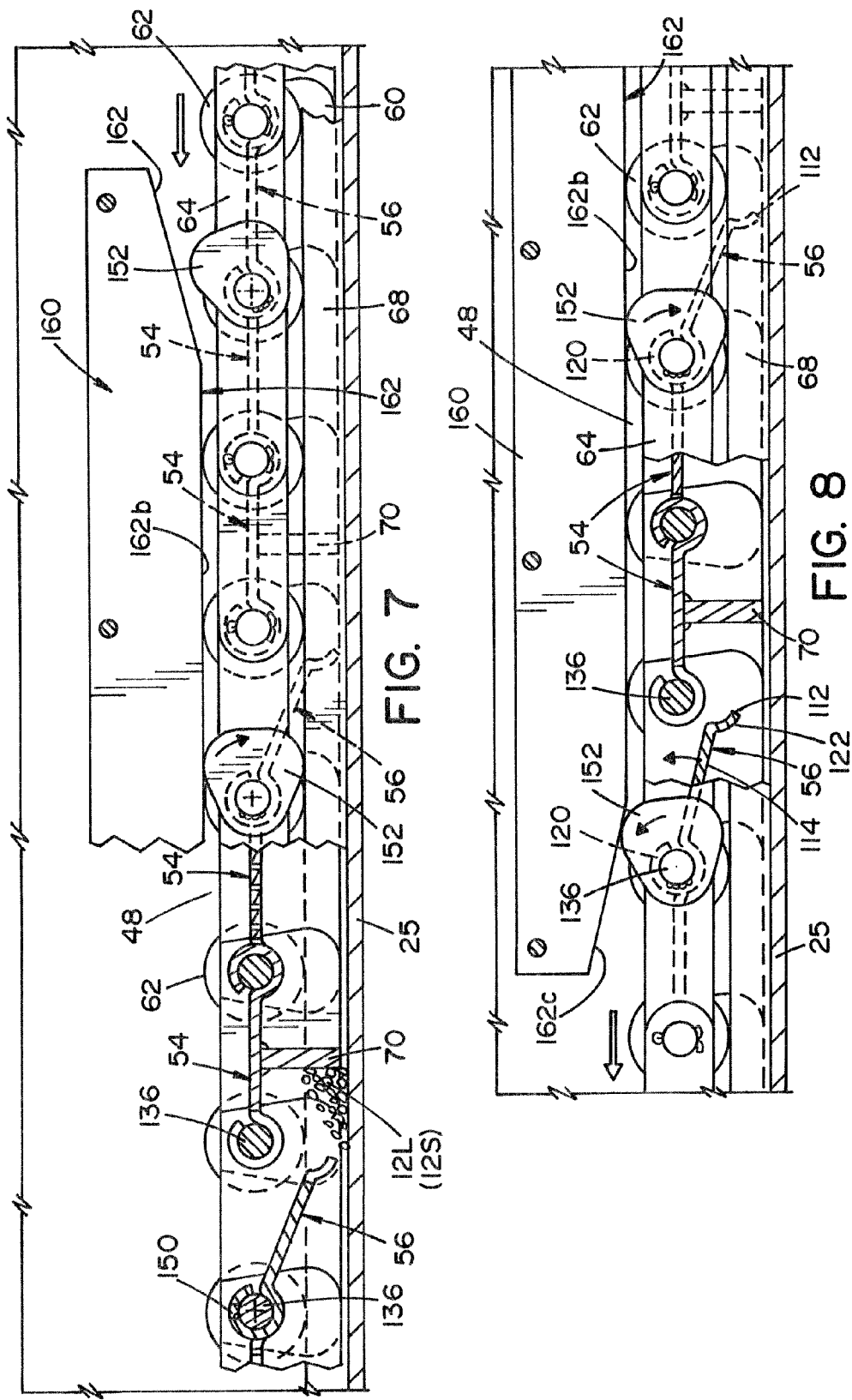

FILTERING APPARATUS WITH HINGE BELT

CROSS-REFERENCES TO RELATED APPLICATIONS

This application claims priority to U.S. Provisional Application Ser. No. 61/007,473, filed Dec. 13, 2007 which is incorporated by reference herein in its entirety.

The invention of this application relates in general to apparatus for filtering contaminated liquid such as machine tool coolant which contains suspended particles such as metal and/or nonmetal chips. More specifically, the invention of this application relates to a filtering apparatus with a hinge belt to remove large particles from the liquid and a filter to remove the fine particles.

INCORPORATION BY REFERENCE

Lenhart, U.S. Pat. No. 5,328,611 discloses an arrangement for mounting and operating a filter drum including backwashing the filter without a pipe dedicated solely for that purpose and is hereby incorporated by reference herein in its entirety and which forms a part of the specification of this application.

Ota, U.S. Pat. No. 5,992,642 discloses a hinge belt conveyor arrangement and is hereby incorporated by reference herein in its entirety and which forms a part of the specification of this application.

BACKGROUND

In a belt style filtering apparatus, a contaminated fluid is directed into an endless belt conveyor wherein the fluid passes through the belt and at least some contaminants do not pass through the belt wherein these contaminants, such as the large particles, are carried away on the belt. The fluid can then be directed into another filtering arrangement to remove other contaminants such as the finer particles.

In these belt style filtering apparatus, the contaminated is directed to the belt by gravity wherein the fluid engages the belt from above and gravity urges the fluid through the belt and into a containment vessel. The belt moves generally perpendicular to this flow or horizontally and the belt conveys the contaminants cross-wise from under this flow of contaminated fluid. The hinge belt is configured to allow the liquid and a designated size of small particles to pass through the belt, but not a designated size of large particles. As can be appreciated, this belt configuration and the designated particle sizes can vary based on the contaminants to be filtered. For example only, machining operations of different types of metal produce different sized and shaped "chips" from long spiraled chips to fine particles wherein the dividing line between these "large" and "small" particle sizes can vary significantly to accommodate the particular chip configuration.

The hinge belt filters the large particles from the liquid, and carries them away for discharge in a collection bin. The partially cleaned fluid flows from the hinge belt into a tank. The filtering apparatus can further include a secondary filtering arrangement for these smaller particles that have passed through the belt. In this respect, the system can include a rotating drum system with a filtering screen that is supported within the tank and is partially immersed in the partially cleaned fluid in the tank. The partially cleaned fluid or liquid in the tank is urged toward the drum in that the cleaned fluid is pumped from the tank by way of the tank outlet being positioned inside the drum. As a result, the partially clean fluid flows into the drum by flowing through the screen wherein the filtering is completed and the fluid inside the drum is "clean" fluid wherein a substantial portion of a desired range of solids have been removed from the fluid. As is known, this "clean" fluid does not need to be 100% clean which is typically unnecessary.

The filtered or "clean" liquid flows axially out of the drum through the outlet opening in one end wall of the drum and an adjacent wall of the tank. A portion of this filtered liquid can also be used to help clean the screen extending about the drum. This is accomplished by directing some of this filtered liquid, under pressure, to a spray nozzle facing the drum screen in order to dislodge any particles or chips that may be clinging to this screen thereby cleaning the screen of these collected particles. These particles or chips, together with other entrained particles in the fluid settle out of the liquid and drop to the bottom of the tank or reservoir. However, as can be appreciated, these entrained particles need to be removed or they would build up on the bottom of the tank and eventually affect the performance of the filtering system by, for example, seizes one or more moving components.

These remaining contaminants can be removed manually and often were in prior art system. As can be appreciated, this can be costly and can result in down time for the filter system. Some prior art systems have attempted to remove these contaminants by way of mechanical systems such as drag bars configured to move along the bottom of the reservoir. These drag bars can be connected to separate mechanical systems or in some cases can be mechanically coupled to the belt.

More particularly, these drag bars can be a separate system moving along the bottom of the tank. In another prior art arrangement, the drag bars are secured to the outside of the hinge belt. However, in this arrangement, the small particles between upper and lower paths in the tank can get trapped, and will settle and collect on the inside of the hinge belt, causing eventual jamming or blockage in the system ultimately resulting in manual cleaning and down time of the system.

In other prior arrangement, the drag bars are secured to the chains of a drag unit which is separate from the hinge belt, which is typically located above the drag unit. While this arrangement avoids the trapped particles difficulties of the first mentioned prior arrangement, it results in substantially significant expense, complexity and space penalties, resulting from the need to provide two endless conveyor arrangements including corresponding supports and drive elements.

SUMMARY OF THE INVENTION

The invention of this application relates to filters and, more particularly, to an endless belt filtering system for separating solid particles from a flow of contaminated liquid to produce a generally clean liquid.

In one embodiment, provided is an improved endless belt filtering system for separating solid particles from a flow of contaminated liquid to produce a generally clean liquid. This improved system having a continuous loop belt extending between a first end and a second end and being formed by a plurality of plates pivotably joined to one another about spaced horizontal axes. The plurality of plates together forming an outwardly facing side and an inwardly facing side, the belt further including an upper section wherein the outward side generally faces up and moves from the first end toward the second end and an opposite lower section wherein the outward side generally faces down and moves from the second end toward the first end. The system having a housing forming a tank with a bottom, an end wall near the first end and a pair of side walls extending from the end wall. The lower section of the belt including a bottom region passing near the tank bottom and the plurality of plates including pivot plates having pivoting flaps that are pivotable between an opened condition and a closed condition. The flaps being in the opened condition when in the bottom region and in the closed condition when in the inlet region such that movement of the portion of particles through the belt is restricted in the inlet region and is promoted in the bottom region.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 7 is a side view of a cam operated hinged plate (input end);

FIG. 8 is a side view of a cam operated hinged plate (output end);

DETAILED DESCRIPTION OF THE INVENTION

Figure 1:
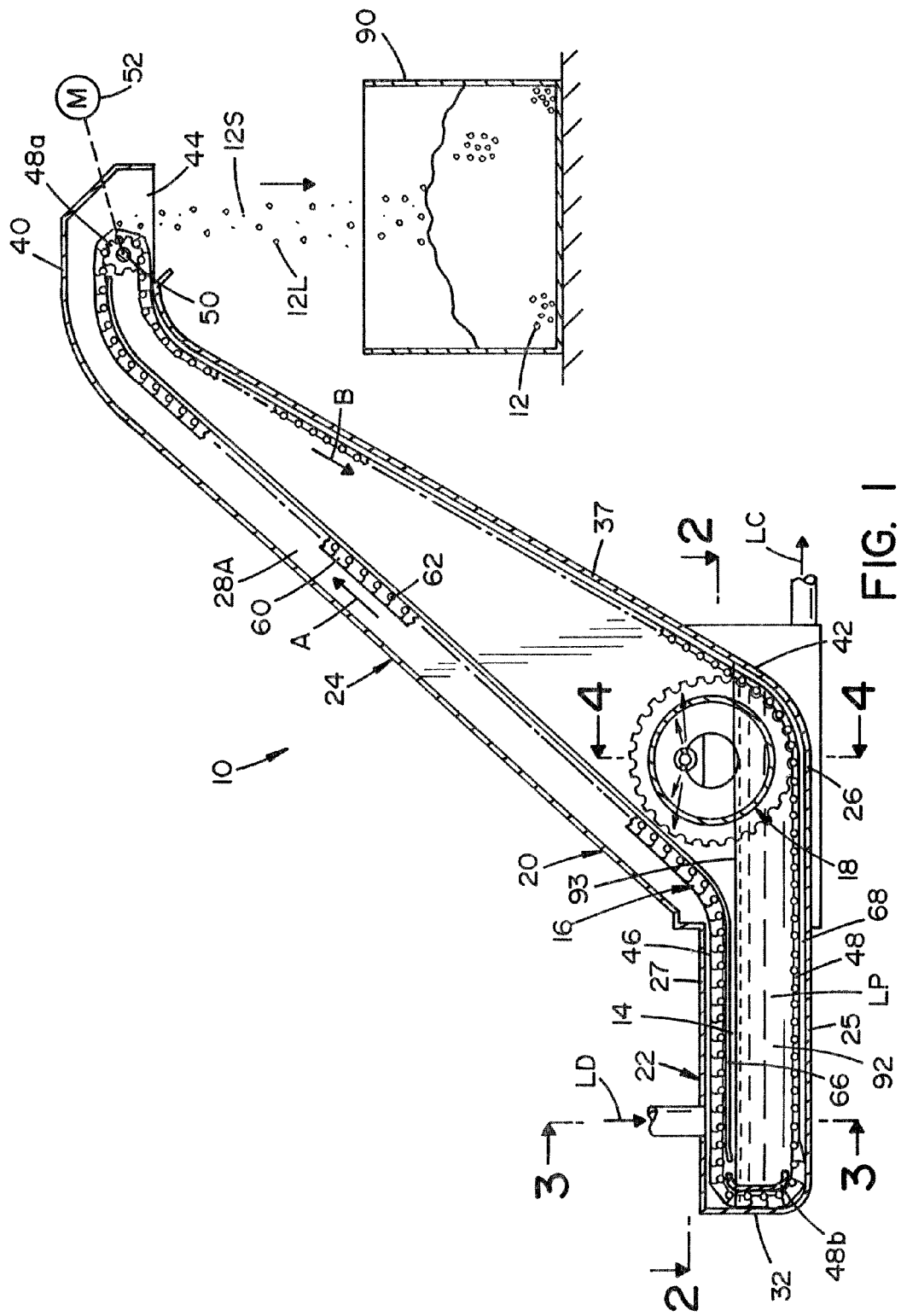
FIG. 1 is a side section of a filter system according to one aspect of the present invention.
Figure 2:
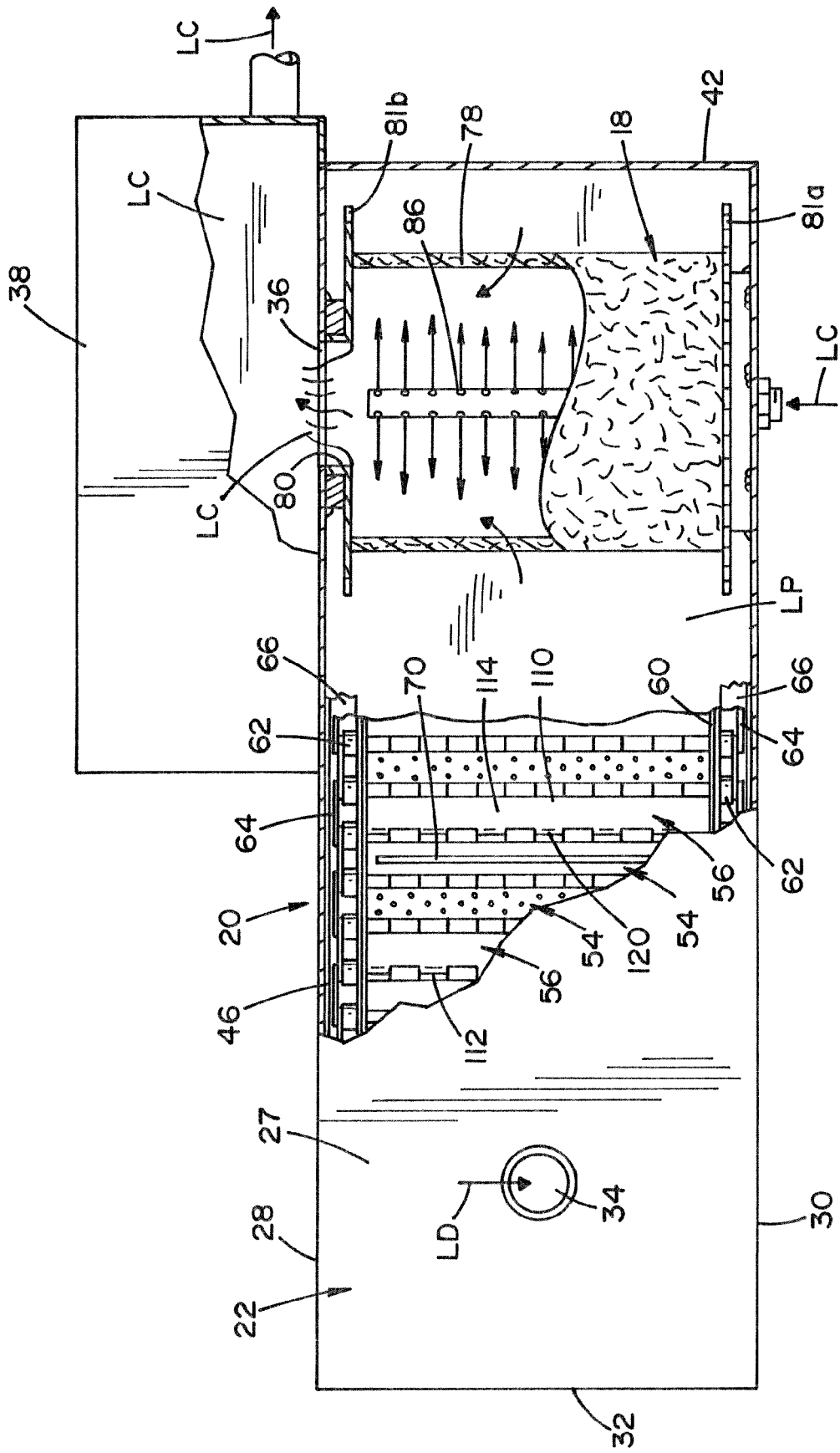
FIG. 2 is a plan view partially in section taken along line 2-2 of FIG. 1.
Figure 3:
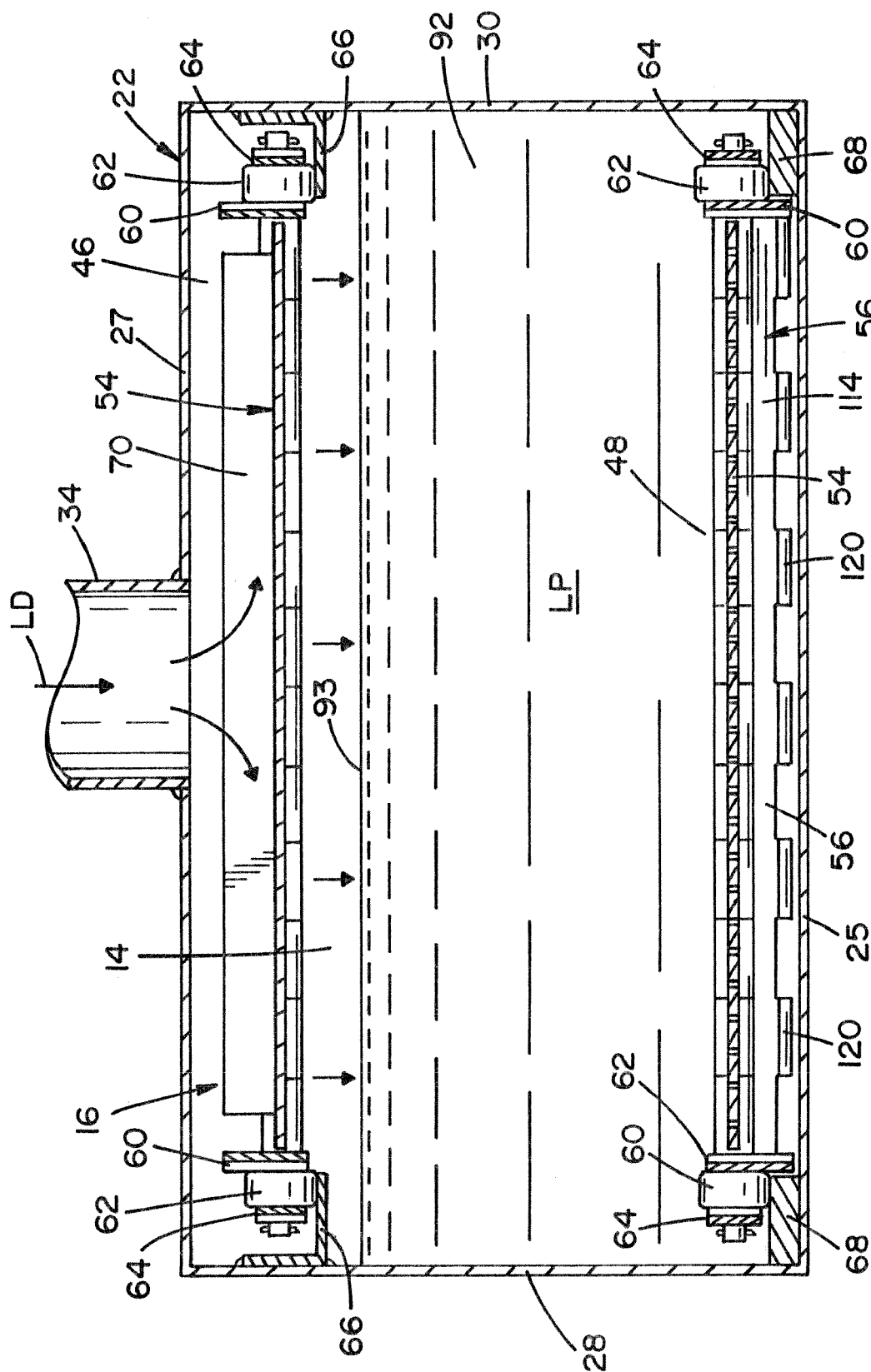
FIG. 3 is a section taken along line 3-3 of FIG. 1.
Figure 4:
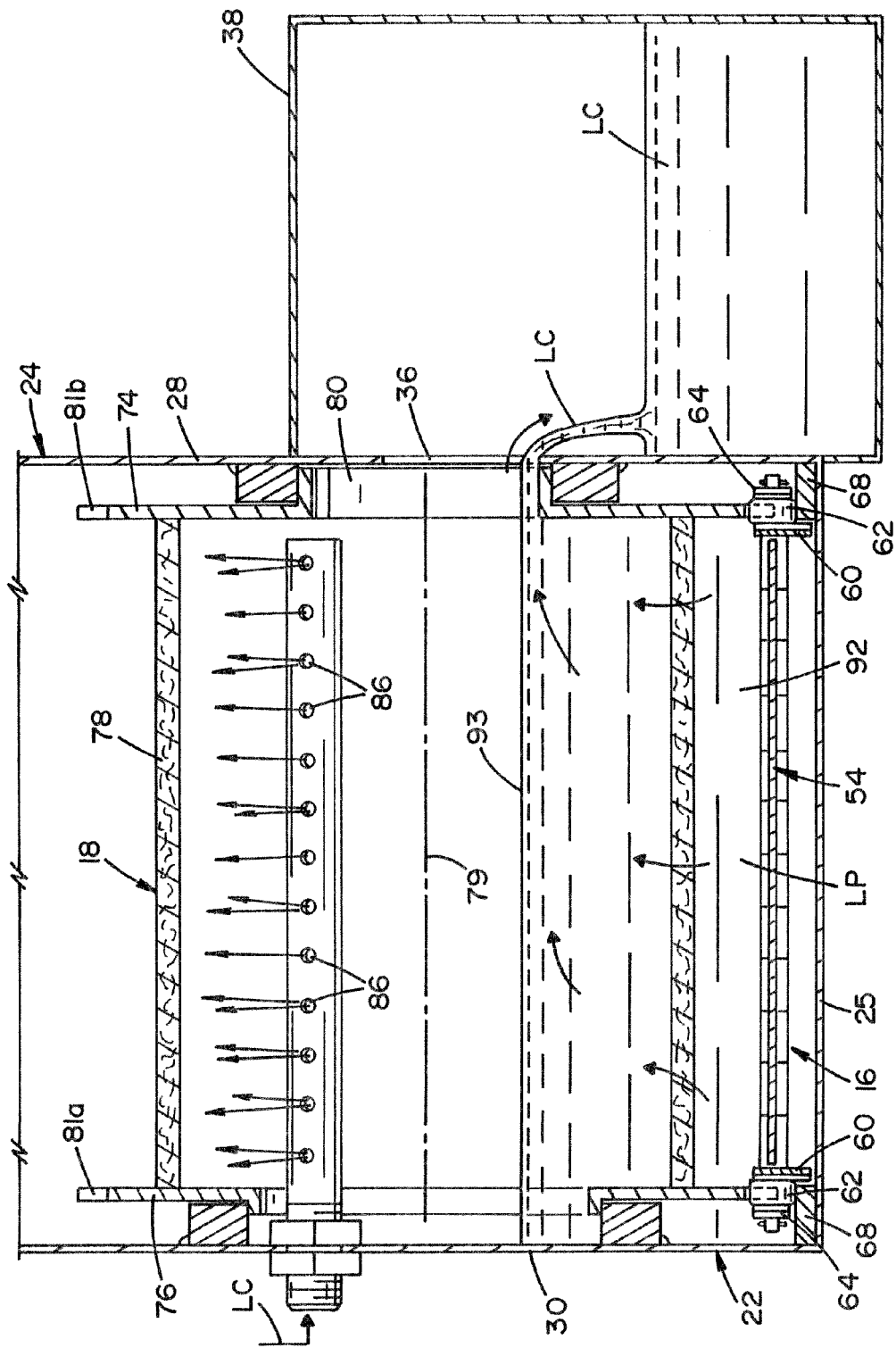
FIG. 4 is a section taken along line 4-4 of FIG. 1.

Referring now to the drawings wherein the showings are for the purpose of illustrating preferred and alternative embodiments of the invention only and not for the purpose of limiting same, FIGS. 1-4 shows a filter system 10 for filtering particles 12 from a flow of liquid L (i.e., "contaminated liquid" LD), and for producing a flow of clean liquid therefrom LC. The contaminated liquid may, for example, be machine tool coolant which is contaminated with metal and/or non-metal chips and other particles.

Filtering apparatus 10 includes a tank 14 through which the liquid flows, filter 10 includes a hinge belt conveyor 16 partially positioned in tank 14 for filtering large particles 12L from liquid LD, and a drum filter 18 within belt tank 14 for filtering small particles 12S liquid L. In one embodiment, the filtering apparatus includes a housing 20 with a first, generally horizontal leg 22 and second, inclined leg 24 that is inclined upwardly from one end 26 of the first leg. The tank is established in first leg 22, with a flat bottom 25, between sides 28, 30 and end 32. First leg 22 further includes a top 27 that is provided with an inlet opening 34 for receiving contaminated liquid LD. The side 28 of the tank has an outlet opening 36 for discharge of cleaned liquid LC into a side tank 38. The inclined leg is also established with an inclined bottom 37, between sides 28A, 30A and upper and lower ends 40 and 42, respectively. The lower end of inclined leg 24 merges with end 26 of the horizontal leg 22. Upper end 40 has an outlet opening 44 for discharge of particles 12G and 12S removed from liquid LD. Hinge belt conveyor 16 is oriented with an upper portion 46 and a lower portion 48, and travels endlessly (i.e., loops around) between tail end 32 and upper end 40. Upper portion 46 includes the belt passing over the tank and through the length of the tank, and further along the inclined leg wherein upper portion 46 generally terminates at a position over discharge opening 44. The lower portion of the hinge belt extends downwardly from opening 44 toward lower end 42 wherein it is immersed in the liquid in the tank as it passes through horizontal leg 22. The upper end of the hinge belt 16 is supported by sprockets 48a wherein sprockets 48a are driven by a shaft 50 that is journaled for rotation in bearings (not shown). As can be appreciated, sprocket 48a can be used to drive or power the hinge belt. Further, sprockets 48a could be multiple sets of sprockets or even a large diameter sprocket. In one embodiment, shaft 50 at the upper end is coupled to a rotary drive unit 52 to rotate the upper shaft and sprockets and thereby drive the belt through its endless path as indicated by arrows "A" (the upper belt path) and "B" (the lower belt path). The lower end can also include one or more sprockets and/or can include a fixed support 48b to guide the belt as it loops from the bottom path to the top path.

Hinge belt 16 can be constructed with a plurality of hinge plates 54, and a plurality of live plates or links 56 pivotally connected together by hinge or pivot pins to establish a continuous or endless belt which will be described in greater detail below.

Side plates 60 are secured at the outer edges of each of the hinge plates and live links. Rollers 62 are rotatably carried on both ends of the pivot pins, outside the side plates. The rollers are held in position on the pins between pairs of outer links 64. The rollers when in the upper and lower belt passes are supported by (i.e., roll on) upper and lower fixed guides 66, 68 respectively, that are secured to the sides of the housing and track the belt path shown. Each of these can include lead in or out sections for transitional portions of the guides. The hinge plates may be provided with small holes through which liquid and small particles 12S may pass, but not large particles 12L, or the hinge plates may be provided without such holes, in which case the liquid and small particles will flow between and around the plates. Drag bars 70 (sometimes called cleats or pusher bars) can be secured at periodic intervals to the hinge belt 16 for travel therewith. In one embodiment, the drag bars extend outwardly from the hinge belt, to sweep along bottom 25 of tank 14 and the bottom of the inclined leg as the hinge belt rotates, to drag chips accumulated thereon towards tail end 32 of the housing, then up to the top of the belt path 46 and to discharge opening 44 at the top of the inclined leg.

Hinge belt 16 is formed by a plurality of these hinge plates 54 and live links or pivot plates 56 that are all pivotally connected together with by pins. As is shown, belt 16 is formed by alternating hinge plates and pivot plates such that the belt generally includes an equal amount of plates. While in one embodiment, the belt does generally include the same number of each plates; this proportion is not required. In some embodiments there are more of either plate depending on operating conditions and the chips or particles to be removed from the liquid. In one embodiment, less than 75 percent of pivot plates 56 are used in belt 16. In yet another embodiment, between 30 and 75 percent of plates are pivot plates. A further embodiment includes approximately 50 percent of the plates are pivot plates 56.

The filter drum 18 is rotatably mounted between tank side walls 28 and 30 and can be positioned in leg 22 near transition 26 in the tank 14, and is partially immersed in a pool of partially cleaned liquid LP in the tank. The drum is generally cylindrical, with end walls 74, 76 and a tubular filter element 78, which can be any filter apparatus including, but not limited to, a fine screen mesh which can be a replaceable filter element. The drum is rotatable in the tank about a horizontal axis 79 and drum 18 can be driven by the hinge belt. In this respect, drum 18 can include sprockets 81*a* and 81*b* configured to operatively engage with hinge belt 16 to rotate the drum as the hinge belt is driven. Outlet opening 80 formed in end wall 74 permits filtered coolant in the drum to be discharged axially out of the drum through the end wall. The outlet openings communicate with an outlet opening 36 in tank side wall 28 and can be positioned above the clean coolant tank 38 such that filtered or clean coolant LC spills out of the drum and into the clean coolant tank. Filter system 10 can further include one or more spray nozzles 86 that are positioned on the inside of the drum 18. Nozzles are connected to receive and spray clean liquid LC outwardly through filter media 78 and flush this filter of accumulated particles. Lenhart, U.S. Pat. No. 5,328,611, incorporated herein in by reference, discloses a filter drum arrangement.

During operation of the filtering apparatus 10, contaminated liquid LD is gravity fed into chip filter inlet 34 located above hinge belt 16 in top 27 of tank 14. From inlet 34, contaminated liquid LD flows onto, around, and through upper portion 46 of the hinge belt which is moving cross-wise under the inlet flow of the liquid LD. The hinge belt is configured to allow the liquid and small entrained particles 12S to pass, but not the large particles 12L which are carried away by the upper portion 46 of the hinge belt and discharged through opening 44 whereupon the discharged particles fall into a collection bin 90 which is periodically emptied. Thus, the hinge belt separates the large particles 12L from liquid, carries the large particles along path "A" to discharge opening 44, and the fluid and small particles 12S pass the belt and form the partially clean liquid LP that forms a pool 92 of this semi-cleaned liquid LP in tank 14. Pool 92 partially fills tank 14 and has a top liquid level 93 that is spaced below upper portion 46. The heavy chips that flow by the upper hinge belt pass, into the pool 92, settle to the bottom of the tank. Drag bars 70 secured to lower portion 48 of hinge belt 16 sweep along bottom 25 of the tank as the hinge belt moves to convey these chips on the bottom of the tank towards tail end 32 of the tank, and then around the tail end onto the upper portion 46 of the belt, whereupon these chips are carried with the larger chips on the upper pass of the belt up the inclined side for discharge into collection bin 90. In order to help facilitate the movement of all chips on belt portion 46, hinge belt 16 can include sections of belt 16 without chip opening adjacent to drag bars 70.

The particles 12L and/or 12S in the tank that remain suspended in pool 92 can be drawn toward drum 18; however, tubular filter element 78 prevents any remaining chips from entering the drum as the liquid passes drum filter 18. These particles remain outside the drum and many merely fall back into pool 92. The chips that do not fall away are prevented from clogging element 78 in that these particles are sprayed off the filter back into the pool 92 by at least one spray 86 and can then settle towards the bottom in the tank. Again, these particles and any other sludge composition can be carried away by the drag bars as they move under the drum filter and along the bottom of the tank.

Clean coolant LC which is filtered by the drum filter flows axially out of one end of the drum and collects in the clean coolant tank 38, for delivery via a pumping system to the using station (not shown). This clean coolant can also be used to supply the coolant for spray 86.

In order to facilitate the extraction of chip particles that can be trapped between the upper belt portion 46 and lower belt portion 48, the hinge belt is configured with hinge plates or live links 56 that "open" along lower portion 48 in tank 14 and that "close" along the upper portion 46, through the tank and to the discharge location at the top of the path. The hinge plates can open as they pass near drum filter 18 and can remain open along at least a significant length of lower pass 48 between drum 18 and end 32 to provide substantially enhanced, significantly less restricted flow areas for settling of particles in the tank from the region between the upper and lower segments of the belt to the bottom of the tank. These hinge plates then close upon progressing towards the upper path near end 32, and remain closed along upper path 46 increasing particle carrying performance, to carry the particles to the discharge opening. In this way, the present invention provides unique advantages of both creating enhanced downward flow of particles in pool 92 without adversely affecting chip capturing characteristics on the upper side of the belt.

More particularly, hinge belt 16 is provided with a plurality of live links 56 (that may be provided as single links or groups of links) that pivot or swing open as they pass by segment 100 of the lower portion of the belt travel path during conveyor operation to direct fine chip particles from above portion 48 to below this portion into the path of drag bars 70 on bottom 25. The live links swing closed during upper portion 46 of the hinge belt path to provide normal hinge belt operation.

In one embodiment, live links 56 are similar in configuration to the conventional links or hinge plates, except that the live links are configured to pivot along one side, about the pivot pin joining the live link with the conventional hinge plate on one side adjacent thereto, for opening at the other side responsive to gravity and/or a track or camming surface along which a cam element is secured at one or both ends of the pivot pins to travel as the belt moves through its endless path.

Figure 5:
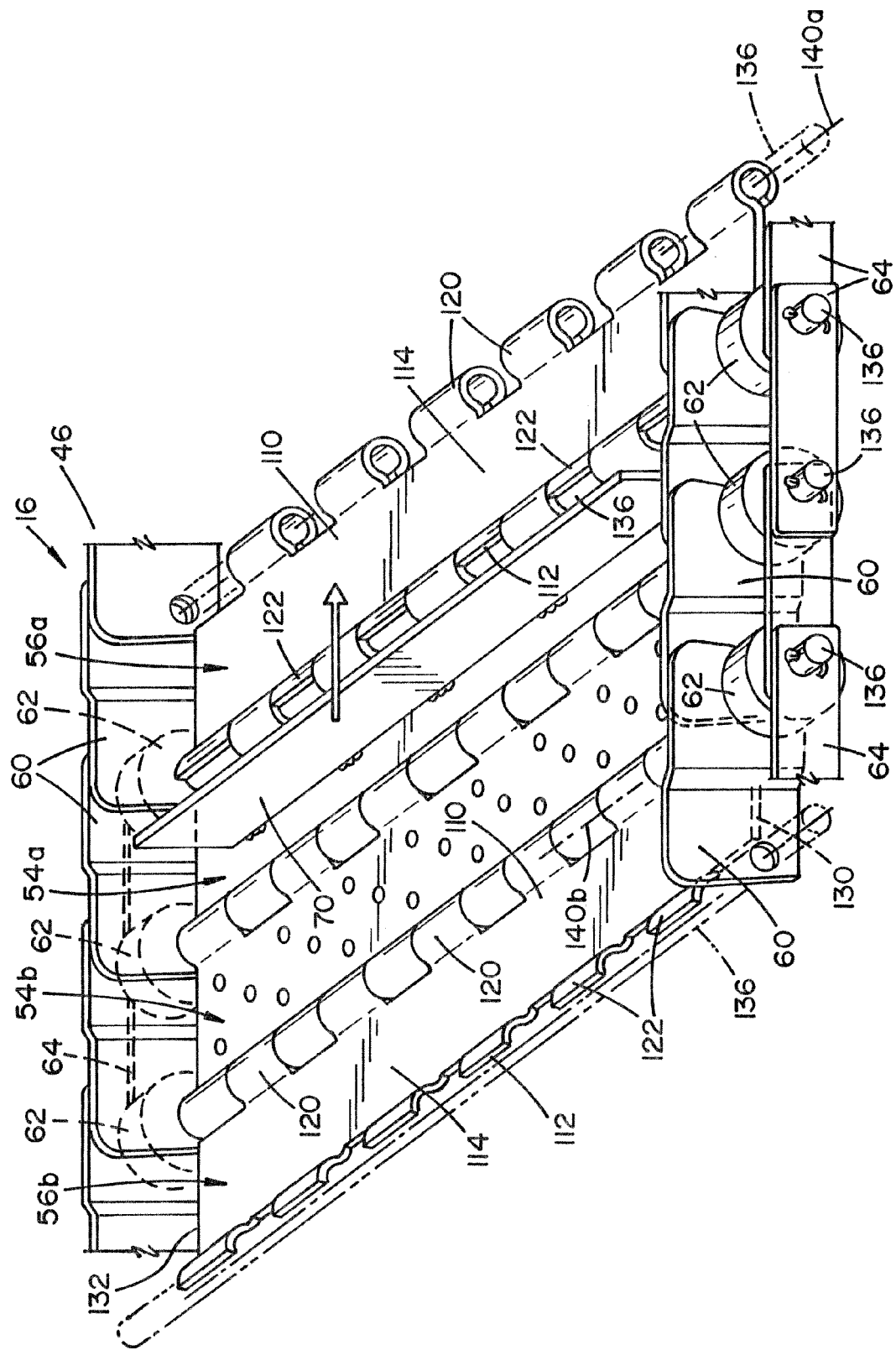
FIG. 5 is a top perspective view of the upper belt portion.

With reference to FIG. 5, shown are hinge plates 54*a* and 54*b* and two live links 56*a* and 56*b* positioned on either side of hinge plates 54. Side plates 60 join these plates together and also join rollers 62 relative to the corresponding link. Links 56*a* and 56*b* have a leading edge 110 and a trailing edge 112 with a center plate 114 therebetween. Links 56*a* and 56*b* further include hinge knuckles 120 along their leading edges 110 with a modified knuckles or swinging-stops 122 on trailing edges 112. Center plates generally extend laterally between side edges 130 and 132 such that hinge plate 54 and links 56 have generally the same width. Further, this width can be adjusted such that the resulting hinge belt is generally as wide as the tank wherein free movement is allowed therethrough but a significant amount of chips are not allowed to accumulate by sides 28 and 30. On leading edge 110 of links 56, knuckles 120 can be conventional pivot-pin receiving knuckles formations aligned axially with the mating hinge knuckles of the adjacent live link and/or hinge plate. In one embodiment, it would be an adjacent conventional hinge plate. These adjacent plates and inks are joined to one another by way of a pivot pin 136 an thereby establish a hinge connection similar to the hinge connection between adjacent hinge plates. In one embodiment, a removable pin can be used to permit the removal of pin 136 via sliding of the pin axial along its axis. However, the pin can also be secured to one of the adjacent plates to maintain its position axially and this can be done by, for example, a spot weld or a press fit connection with one plate; or any other means known in the art.

With this arrangement, live link 56*a* pivots about axis 140*a* and link 56*b* pivots about axis 140*b* which are near the respective front edges 110 of these links. This pivotable action is between an opened position and a closed position wherein the closed position is shown in FIG. 5 which shows a section of belt conveyor which is in an upper position 46 of this endless loop. More particularly, swinging-stops 122 are located along trailing edge 112 of the live link opposite hinge knuckles 120 such that link 56a is pivotable about axis 140a and link 56b is pivotable about axis 140b. The pivotable movement of these links can be controlled as desired. With respect to the closed position, stops 122 are configured to engage the pin 136 of a trailing hinge plate wherein the engagement of the pin stops rotation in the closed position. Again, this is the position of the link when it is top side or section 46 of the belt's travel such that particles 12L and 12S are not permitted to pass through the live link. In the closed position, the live link 56 into general alignment as the hinge plates 54. These stops or swing-stops can be approximately one-quarter of the conventional pivot knuckles that engage the corresponding pivot pin.

Figure 6:
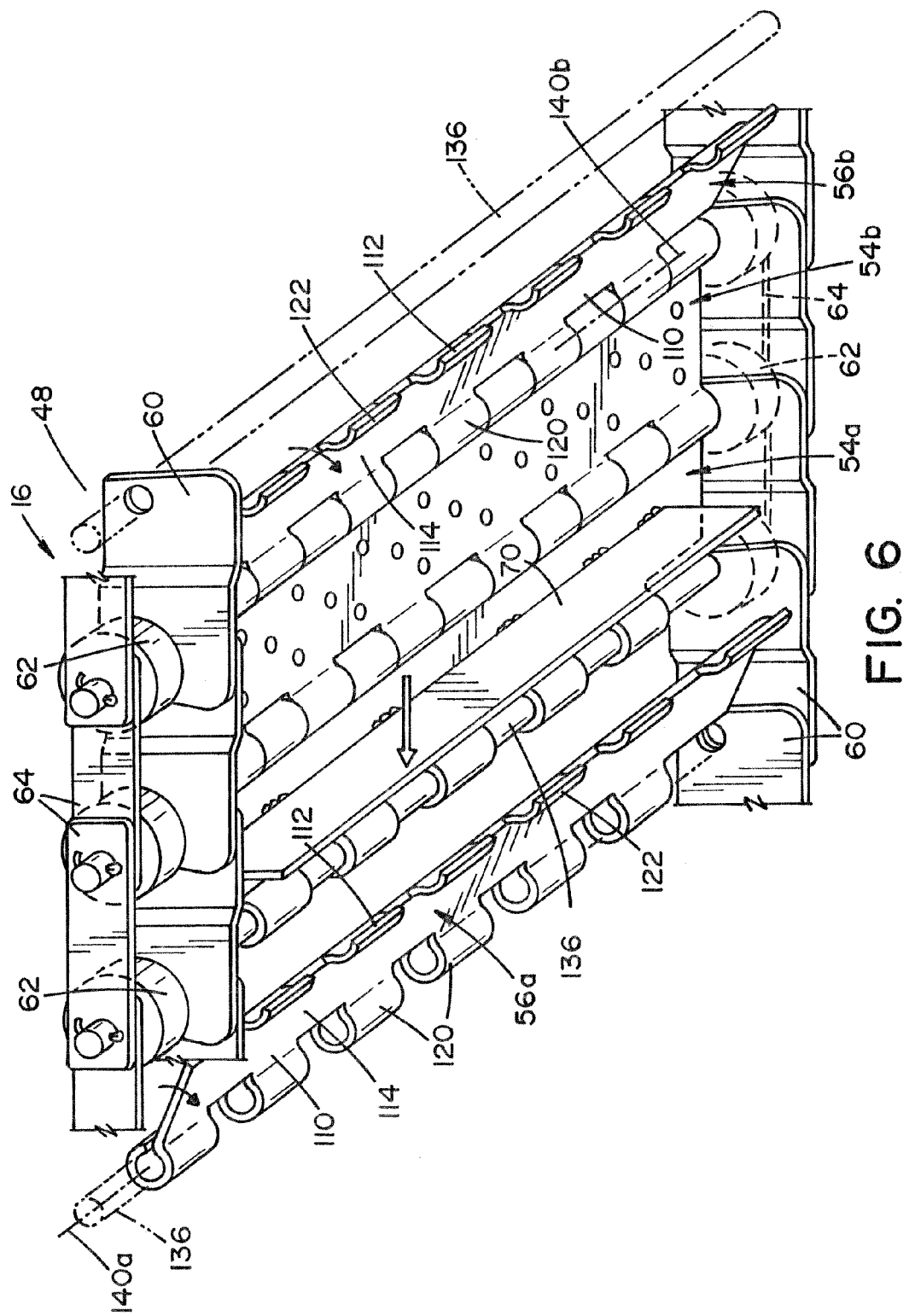
FIG. 6 is a bottom perspective view of the lower belt portion.

With reference to FIG. 6, as live links pass to belt section 48, which is the bottom side of the travel, links 56a and 56b can be allowed to open such that the chips can pass by belt section 48 and reach bottom 25 of tank 14. As is discussed in greater detail above, once the chips reach bottom 25, they can be cleaned by drag bars 70 wherein these drag bars scrape the bottom of the tank and lift the chips to be discarded in hopper or collection bin 90. More particularly, as the links or plates move to section 48, stop 122 becomes positioned below the adjacent pin 136 wherein gravity will not maintain the live link in the closed position. Thus, the live links can be configured to naturally (by gravity) move from the closed position shown in FIG. 5 to the opened position shown in FIG. 6 such that in one embodiment, gravity alone moves the live links between the opened position and the closed position.

In another embodiment, as shown in FIGS. 7 and 8, the opening and closing of live links 56 can be mechanically assisted. In this respect, as is referenced above, each live link 56 can be secured to a corresponding pivot pin 136 such that rotation of pin 136 is translated to the live link. More particularly, link 56a can be secured to pin 136 by welds 150 and secured to the ends of the pivot pins to which these live links are connected, are cam elements 152. Cam elements 152 slide or roll along a cam surfaces to open and/or close the particular live link. More particularly, filter system can further include a cam track 160 having cam surface 162 which forces the opening of the live link when moving through bottom segment or region 100 which is the primary point of interests for the opened condition in this embodiment. As can be appreciated, this can work with or without the assistance of gravity. Cam surface includes a opening surface 162a which urges the live link to the opened condition as cam 152 engages surface 162a. Then, surface 162b maintains the live link in the opened condition as it move below fluid entry point 34 of system 10. Once the live link approaches end 32, surface 162c can be used to allow the live link to close which is the desired position as the link passes about end 32 from lower section 48 to upper section 46. As can be appreciated, it is desirable to hold, not let pass through, the chips when in this position extending about end 32.

As with the lower section, the upper path track segment can also include cam surfaces to positions the cams and to drive the live links to the closed position. This closed condition can be maintained up and down the included portion of the belts travel in that these section do not need to allow chips to pass through. In fact, it may be best if the chips were not allowed to pass through in these sections.

As will be evident, live links according to the invention, may be provided by relatively simple modifications to existing knuckles arrangements of a certain number of hinge plates of a conventional hinge belt, together with or without provision of a cam assist tracking arrangement as needed to ensure the proper opening and closing of the live link.

In another embodiment of this application, live links can rotate about axis 140 such that inks 56 move upwardly to an opened condition instead of downwardly without detracting from the invention of this application. In this embodiment, or in other embodiments, the pivot can also be near the trailing edge of the live link instead of the leading edge. As a result of the pivot point being at the trailing edge, the motion of the trailing link moving through coolant 92 can lift the live link. However, as can be appreciated, a cam actuation system can also be use to ensure proper lifting. In yet other embodiments, biasing members can be used to help urge the live link either to the closed position or to the opened condition. As can also be appreciated, these biasing members can be any biasing members known in the industry including, but not limited to, springs, torsion springs, extension springs, compression springs, plate screen and/or pliable polymers.

Figure 9:
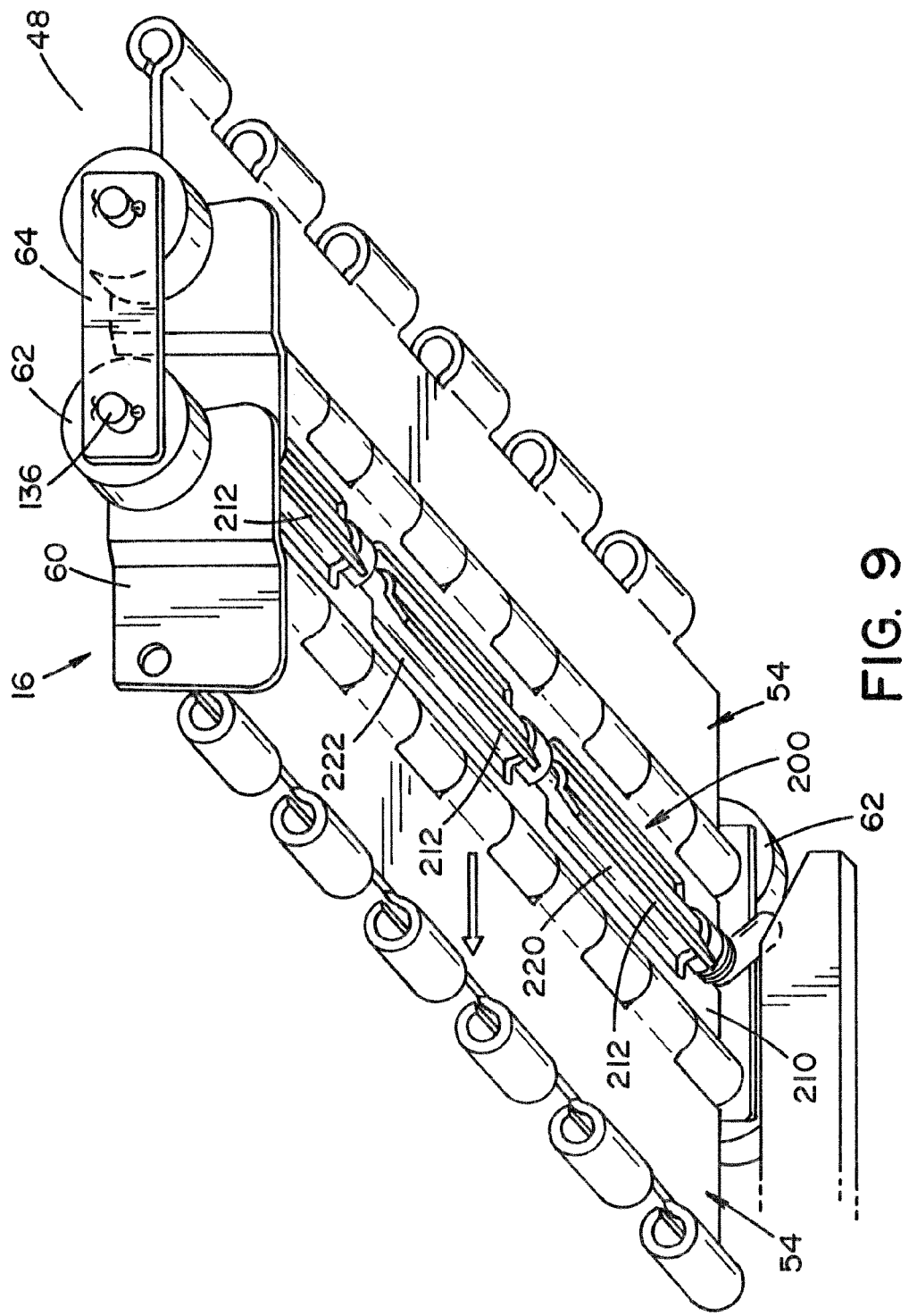
FIG. 9 is a bottom perspective of a center pivot plate.
Figure 10:
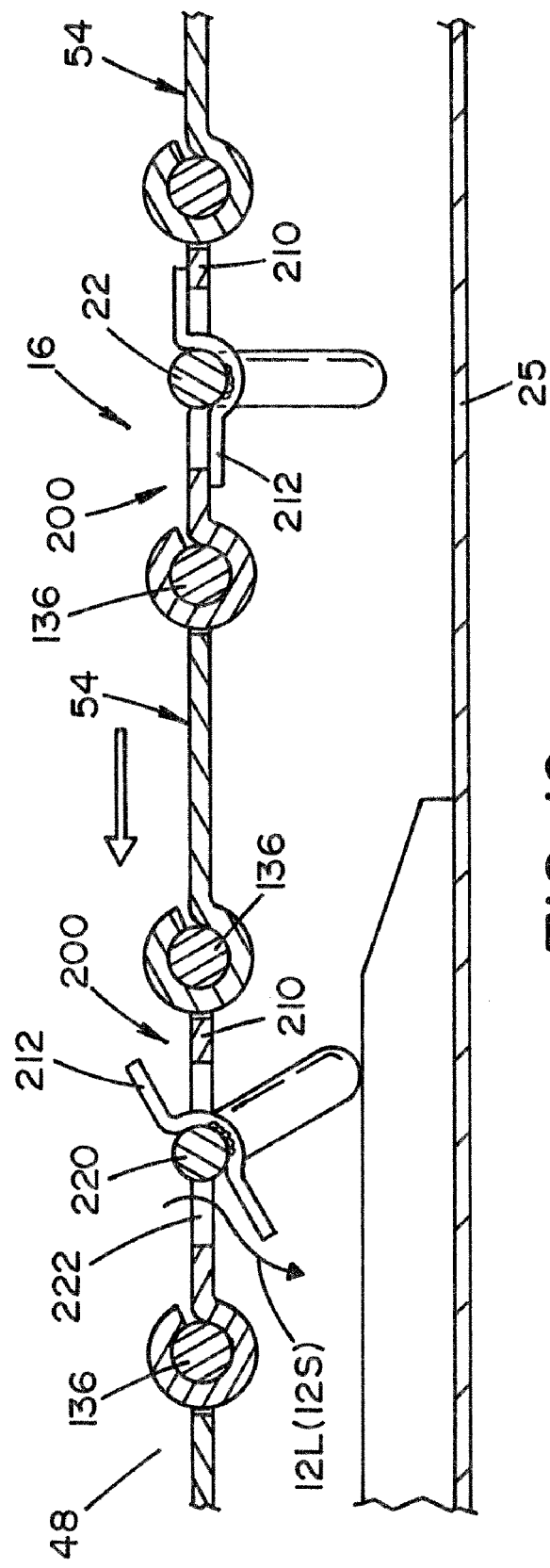
FIG. 10 is a section of FIG. 9.

With reference to FIGS. 9 and 10, shown is live link 200 positioned between hinge plates 54 which includes a non-rotating base plate 210 and one or more live link doors 212 axially spaced along axis 214. Shown is three axially spaced doors 212a, 212b and 212c; however, one or more doors can be sued without detracting from the invention of this application. As can be appreciated, the larger the number of doors, the smaller the physical size of each axially spaced door. These doors can be rotatably secured to a central pivot shaft 220 coaxially with axis 214, for opening and closing doors 212 which can be a single shaft or separate shafts.

Generally, these doors can function similar to the live links discussed above wherein details are not given in the interest of brevity. In this respect, as with the embodiments discussed above, doors 212 are in the opened position when in bottom portion 48 of the belt and are in the closed position when in top portion 46 of the belt. Further, as with the embodiments above the open position can even be only in a desired segment of lower portion 48. Further, gravity, cams, springs or other forces can be used to open and/or close these doors. In one embodiment, doors 212 are spring biased to either open or closed, and actuated in the opposite direction by a lever or cam secured to the end of shaft 220. When in the opened position, doors 212 produce openings 222 wherein the particles 12L and/or 12S can pass therethrough.

In another embodiment, the opening of doors 212 is assisted by a lever 230 fixed relative to the door(s). Lever 230 can function similar to the cams discussed above wherein the lever engages a cam track 232 which generally works as described above but which the lever is positioned inwardly of the side rails. More particularly, lever 230 includes a cam surface 234 and this surface is directed into cam track 232 such that cam track surface 240 urges door(s) 212 open as the doors pass over the track. Then, surface 242 can be used to maintain door(s) 212 in the opened position for a desired travel length. After the desired travel length is passed, the door can be allowed to close by way of gravity alone and/or in combination with another cam surface or even a biasing member 244 as discussed above.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention.

It is claimed:

1. An endless belt filtering system for separating solid particles from a flow of contaminated liquid to produce a generally clean liquid, said system comprising a continuous loop belt extending between a first end and a second end and being formed by a plurality of plates pivotably joined to one another about spaced horizontal axes, said plurality of plates together forming an outwardly facing side and an inwardly facing side, said belt further including an upper section wherein said outward side generally faces up and forms a chip supporting surface, said outward side of said upper section moving from said first end toward said second end and an opposite lower section wherein said outward side generally faces down and moves from said second end toward said first end, said inwardly facing side of said belt defining a central region, said system further comprising a housing including a tank having a bottom, an end wall near said first end and a pair of side walls extending from said end wall, said lower portion of said belt moving through said tank such that said plates move toward said end wall, said system further including an inlet region in said upper section wherein an associated flow of contaminated liquid that includes a mixture of a liquid and solid particles is directed against said belt such that a portion of said liquid flows through said belt and a first portion of said solid particles remains on said chip supporting surface and a second portion of said solid particles flows through said belt into said central region, said lower section of said belt including a bottom region passing near said tank bottom, said plurality of plates including pivot plates having pivoting flaps that are automatically pivotable between an opened condition and a closed condition, said flaps being in said opened condition when in said bottom region to allow said second portion of said solid particles to flow from said central region toward said tank bottom and in said closed condition when in said inlet region to maximize said first portion of said particles supported by said chip supporting surface in said inlet region, when in said bottom region, said opened condition allowing the formation of an accumulation of said solid particles between said outwardly facing side of said bottom region and said tank bottom, said belt urging said accumulation toward said chip supporting surface, said system further including a fluid outlet port spaced from said tank bottom to allow the outflow of an associated generally clean liquid.

2. The filtering system of claim 1, wherein said belt further includes drag bars on said outward side, said drag bars moving along said tank bottom in said bottom region toward said first end when in said lower section of said belt, said drag bars urging said accumulation of particles from said bottom region toward said chip supporting surface.

3. The filtering system of claim 2, wherein said drag bars are positioned on said belt between adjacent pivot plates and spaced from said adjacent pivot plates such that said accumulation is directed toward a subsequent drag bar.

4. The filtering system of claim 2, wherein each of said drag bars are positioned on one of said non-pivoting plates behind one of said pivot plates such that a portion of said accumulation is directed toward said each drag bar.

5. The filtering system of claim 2, wherein said drag bars at least partially engage said tank bottom when in said bottom region.

6. The filtering system of claim 1, wherein less than 75 percent of said plurality of plates are said pivot plates.

7. The filtering system of claim 6, wherein every other plate in said belt is said pivot plate.

8. The filtering system of claim 1, wherein between 30 and 75 percent of said plurality of plates are said pivot plates.

9. The filtering system of claim 1, wherein approximately 50 percent of said plurality of plates are said pivot plates.

10. The filtering system of claim 1, wherein said pivot plates include central plate region generally fixed relative to said belt and a plurality of flaps pivotable relative to said central plate regions.

11. The filtering system of claim 10, wherein said plurality of flaps are in said central plate region.

12. The filtering system of claim 10, wherein said plurality of flaps is three flaps.

13. The filtering system of claim 1, wherein said pivot plates are said flap such that said pivot plate pivots about a horizontal plate axis relative to said belt.

14. The filtering system of claim 13, wherein said belt moves in a belt travel direction and said pivot plates include a leading edge facing said direction and an opposite trailing edge, said plate axis being near said leading edge.

15. The filtering system of claim 14, wherein said pivot plates further includes a pivot stop near said trailing edge, said pivot stop being engagable with said belt near said trailing edge such that said pivot plates pivots only from one side of said belt.

16. The filtering system of claim 15, wherein said one side is said of outward side.

17. The filtering system of claim 16, wherein said pivot stop engages said bottom of said tank to limit said opened condition and engages said belt near said trailing edge to maintain said closed condition.

18. The filtering system of claim 17, wherein gravity urges said pivot plate between said opened and closed positions.

19. The filtering system of claim 16, wherein gravity urges said pivot plate between said opened and closed positions.

20. The filtering system of claim 13, wherein said pivot plates further include a pivot pin coaxial with said plate axis and a cam element fixed to said pin, said housing further including a cam surface and said cam engaging said cam surface to move said plate between said opened and closed positions.

21. The filtering system of claim 1, wherein said pivot plates are said flap such that said pivot plate pivots about a horizontal plate axis relative to said belt, said belt moving in a belt travel direction and said pivot plates include a leading edge facing said direction and an opposite trailing edge, said plate axis being near said trailing edge, said pivot plates further including a pivot stop near said leading edge and said pivot stop being engagable with said belt near said leading edge such that said pivot plates pivots inwardly from said belt.

22. The filtering system of claim 21, wherein said pivot plates further include a pivot pin coaxial with said plate axis and a cam element fixed to said pin, said housing further including a cam surface and said cam engaging said cam surface to move said plate between said opened and closed positions.

23. The filtering system of claim 22, wherein said pivot plates further include a biasing member and said biasing member moving said plate between said opened and closed position.

24. The filtering system of claim 1, wherein said pivot plates further include a biasing member and said biasing member moving said plate between said opened and closed position.

25. The filtering system of claim 1, wherein said fluid outlet port is positioned in said central region.

26. The filtering system of claim 1, wherein said plurality of plates includes non-pivoting plates, said system further including drag bars on said outward side of said non-pivoting plates, said drag bars moving along said tank bottom in said bottom region toward said first end when in said lower section of said belt, said drag bars urging said accumulation of particles from said bottom region toward said chip supporting surface.

* * * * *